US008528697B2

(12) United States Patent
Mordukhovich et al.

(10) Patent No.: US 8,528,697 B2
(45) Date of Patent: Sep. 10, 2013

(54) DIFFERENTIAL LUBRICANT TEMPERATURE CONTROLLER

(75) Inventors: Gregory Mordukhovich, Bloomfield Hills, MI (US); Donald G. Maddock, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 996 days.

(21) Appl. No.: 12/190,226

(22) Filed: Aug. 12, 2008

(65) Prior Publication Data

US 2010/0038174 A1  Feb. 18, 2010

(51) Int. Cl.
*F16H 57/04* (2010.01)

(52) U.S. Cl.
USPC ...................................................... 184/6.12

(58) Field of Classification Search
USPC .............. 184/6.12, 6.27, 11.1, 13.1; 74/467, 74/468; 475/159, 160, 230, 231
See application file for complete search history.

(56) References Cited

U.S. PATENT DOCUMENTS

| 1,112,743 | A | | 10/1914 | Wallmann | |
|---|---|---|---|---|---|
| 1,843,070 | A | * | 1/1932 | Shoemaker | 184/13.1 |
| 4,567,784 | A | * | 2/1986 | Hambric | 74/467 |
| 4,736,819 | A | | 4/1988 | Muller | |
| 7,624,660 | B2 | * | 12/2009 | Morise | 74/467 |
| 7,712,581 | B2 | * | 5/2010 | Billings et al. | 184/13.1 |
| 2006/0065487 | A1 | * | 3/2006 | Tominaga et al. | 184/6.12 |
| 2006/0179973 | A1 | * | 8/2006 | Matsufuji et al. | 74/606 R |
| 2007/0078036 | A1 | * | 4/2007 | Morise | 475/159 |
| 2008/0072703 | A1 | * | 3/2008 | Billings et al. | 74/606 R |

FOREIGN PATENT DOCUMENTS

| DE | 199 12 327 A1 | 9/2000 |
|---|---|---|
| JP | 2008 106 794 A | 5/2008 |

* cited by examiner

*Primary Examiner* — William E Dondero
*Assistant Examiner* — Robert T Reese

(57) ABSTRACT

The invention is a device for controlling the temperature and thus the viscosity of the lubricating fluid in a rear axle or differential. A first embodiment of the device comprehends a curved bi-metal strip or plate disposed proximate the ring gear and closely conforming to it. The strip extends about the periphery of the ring gear in the direction of rotation of the gear when the vehicle is moving forward. As the temperature of the lubricating fluid increases or decreases, the bi-metal strip or plate moves to direct a larger or smaller flow of the lubricating fluid toward the housing through which heat is transferred to the atmosphere. In another embodiment, a bi-metal baffle disposed adjacent the ring gear includes a plurality of flaps which open upon a rise in lubricating fluid temperature and direct more fluid to the housing to assist heat dissipation.

20 Claims, 4 Drawing Sheets

DIFFERENTIAL LUBRICANT TEMPERATURE CONTROLLER

FIELD

The present disclosure relates to rear axles or differentials and more particularly to a device for controlling or stabilizing the temperature of lubricating fluid in a rear axle or differential.

BACKGROUND

The statements in this section merely provide background information related to the present disclosure and may or may not constitute prior art.

The power train in a conventional rear wheel drive vehicle includes a rear axle or differential having a gear set which changes the power flow rotational axis from longitudinal to transverse and four caged bevel gears which allow the wheels and axles to rotate at different speeds when, for example, the vehicle is turning. Many four wheel drive vehicles also utilize a differential in the front axle for the same purpose.

Maintaining proper lubrication in the rear axle or differential, particularly the hypoid gear set, is both critical and challenging. Lubrication of the hypoid gear set is essentially achieved by rotation of the ring gear through the lubricating fluid which fills the lower portion of the differential housing. Lubricating fluid is carried by and between the gear teeth and into the region of mesh with the pinion or worm gear. The speed of the ring gear and the viscosity of the lubricating fluid determine how much lubricating fluid will be carried by the ring gear and thus available to lubricate the mesh as well as how vigorously the fluid will circulate within the axle housing.

Since the speed of rotation is directly related to vehicle speed, it is essentially an uncontrolled variable. The viscosity of the lubricating fluid is related to its temperature and this may vary significantly in the course of vehicle operation. The viscosity of the lubricating fluid should be high enough to form a film at the mesh thick enough to separate mating surfaces to avoid scoring or abrasive wear. Higher fluid viscosities are thus preferable as they ensure that more fluid will be carried by the ring gear teeth to the mesh. Viscosities that are too high, however, contribute to frictional and churning losses which can account for a significant portion of the energy loss in a differential. The problem of energy loss due to high viscosity is particularly acute during start ups in cold environments.

From the foregoing, it is apparent that improvements in rear axles and differentials to provide improved gear lubrication and reduced frictional losses through improved viscosity control would be desirable.

SUMMARY

The present invention is a device for controlling the temperature and thus the viscosity of the lubricating fluid in a rear axle or differential. A first embodiment of the device comprehends a curved bi-metal element such as a strip or plate disposed proximate the ring gear and closely conforming to it. The strip or plate is secured to a housing of the rear axle or differential and extends about the periphery of the ring gear in the direction of rotation of the gear when the vehicle is moving forward. At lower temperatures or from a cold start, the bi-metal strip closely conforms to the periphery of the ring gear and thus returns lubricating fluid that the ring gear is carrying back to the sump. This direct recirculation raises the temperature of the fluid as quickly as possible. As the temperature of the lubricating fluid rises, the bi-metal strip straightens and moves away from the ring gear allowing the fluid carried by the ring gear to disperse and spray over the inside walls of the differential housing and cool by transferring heat to the ambient. This action becomes more pronounced as the temperature rises and the speed of the ring gear increases—both conditions requiring increased heat dissipation through the walls of the differential housing to lower the temperature of the lubricating fluid.

In another embodiment, which may be utilized with or independent of the first embodiment described above, a curved bi-metal strip or baffle is disposed between the ring gear and the rear cover of the differential housing. The baffle includes a plurality of bi-metal louvers or flaps that move from a first, closed position to a second, open position as the temperature of the differential lubricating fluid increases. In the closed position, the lubricating fluid circulates with the ring gear such that the rotating motion and friction warm the fluid. In the second position, the louvers or flaps open windows or apertures that allow the lubricating fluid to contact the inner wall of the rear cover of the housing and dissipate heat to the ambient.

It will thus be appreciated that a differential lubrication temperature stabilizer or controller according to the present invention provides a substantially passive device that enhances warmup of the lubricating fluid and adjusts heat dissipation through the differential housing to stabilize the temperature of the lubricating fluid and its viscosity.

It is thus an object of the present invention to provide a device for stabilizing the temperature of the lubricating fluid in the rear axle or differential of a motor vehicle.

It is a further object of the present invention to provide a device for stabilizing the viscosity of the lubricating fluid in the rear axle or differential of a motor vehicle.

It is a still further object of the present invention to provide a bi-metal device for controlling the temperature of the lubricating fluid in the rear axle or differential of a motor vehicle.

It is a still further object of the present invention to provide a bi-metal device for controlling the viscosity of the lubricating fluid in the rear axle or differential of a motor vehicle.

It is a still further object of the present invention to provide a substantially passive device for controlling the temperature of the lubricating fluid in the rear axle or differential of a motor vehicle.

It is a still further object of the present invention to provide a substantially passive device for controlling the viscosity of the lubricating fluid in the rear axle or differential of a motor vehicle.

It is a still further object of the present invention to provide a bi-metal device comprehending a curved strip which moves away from a ring gear of a differential as its temperature increases.

It is a still further object of the present invention to provide a bi-metal device comprehending a curved baffle having a plurality of flaps which move to open a like plurality of apertures as its temperature increases.

Further objects and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
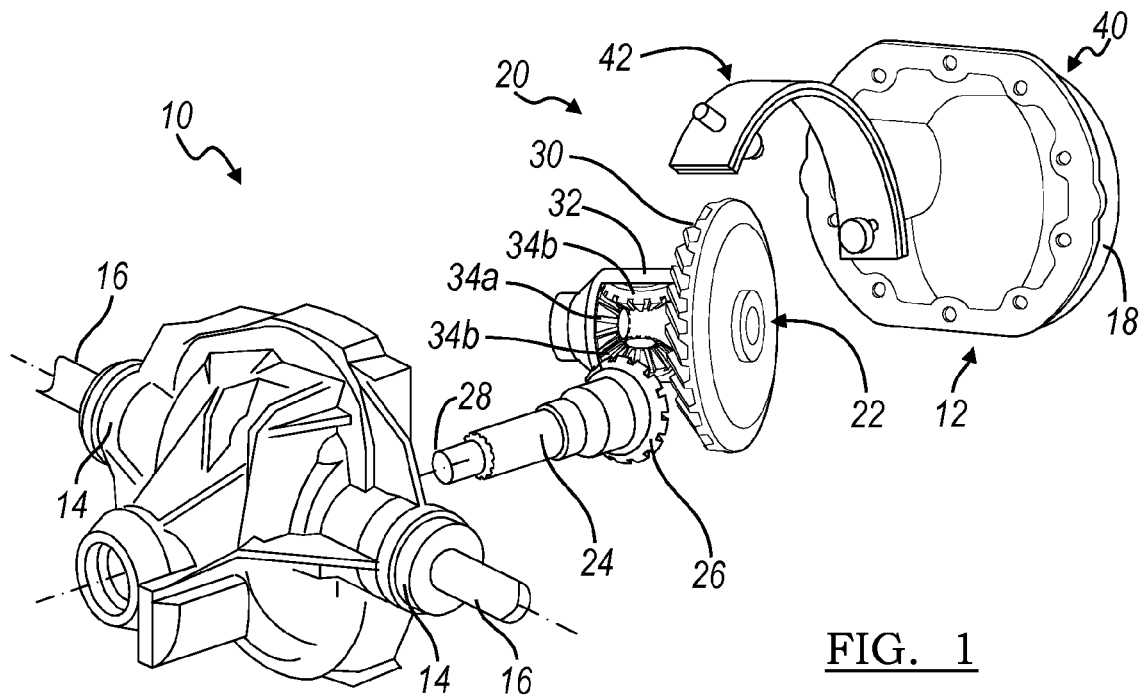
FIG. 1 is a schematic view of a rear axle or differential of a motor vehicle with a portion cut away to show the present invention.
Figure 2:
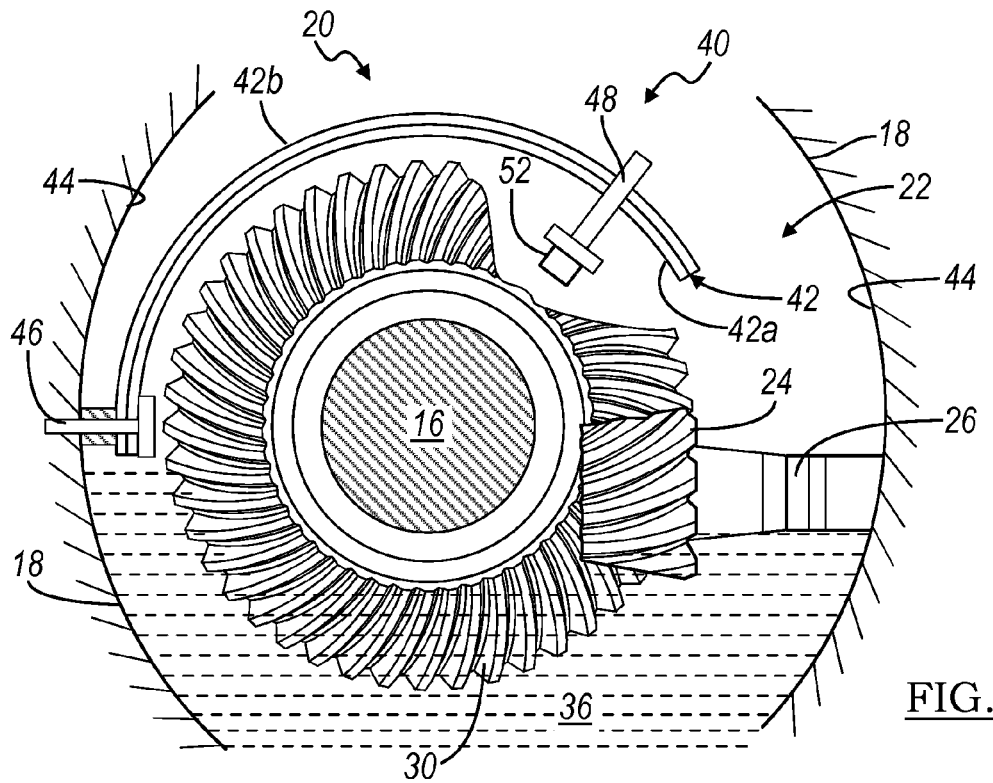
FIG. 2 is a side elevational view of a hypoid gear set of a rear axle or differential incorporating the temperature controller of the present invention at a low temperature.

With reference now to FIGS. 1 and 2, a portion of a rear axle of a motor vehicle drive line is illustrated and designated by the reference number 10. The rear axle assembly 10 includes an elongate housing 12 including a pair of oppositely extending, co-axial axle housings 14 which receive and support a like pair of rear axles or half shafts 16. The rear axle assembly 10 also includes a bulbous center housing 18 containing a rear differential assembly 20. It will be appreciated that while described herein as a rear differential, as this will be the more common application, the present invention is equally suited, adaptable and usable in a front axle or differential of a motor vehicle.

The rear differential assembly 20 includes a hypoid gear set 22 having a worm or drive gear 24 which rotates about a longitudinal axis of the vehicle. Although described herein in association with a hypoid gear set 22, it should be appreciated that the present invention is equally suitable and usable with a bevel gear set. The worm or drive gear 24 is coupled to a stub shaft 26 which extends out of the center housing 18 and terminates at a coupling, flange or portion of a universal joint 28. The worm or drive gear 24 is in constant mesh with and drives a hypoid ring gear 30 which rotates about a transverse axis of the vehicle. The hypoid ring gear 30 is coupled to and drives a differential cage 32 which supports and positions four bevel gears. A first opposed pair of the bevel gears 34A which rotate on the axis of the hypoid ring gear 30 are secured to and drive a respective one of the rear axles or half shafts 16. A second opposed pair of the bevel gears 34B are idler gears and both mesh with both of the first pair of bevel gears 34A. The differential cage 32 and the first and second pairs of bevel gears 34A and 34B operate in conventional fashion to allow differential rotation of the rear axles or half shafts 16 (and associated tire and wheel assemblies which are not illustrated) as the motor vehicle turns or corners. The center housing 18 which receives the just-described components acts as a sump and is filled, typically about half way, with gear lubricating fluid 36.

Referring now to FIG. 2, also disposed within the center housing 18 is a lubricating fluid temperature controlling or stabilizing assembly 40. The lubricant temperature controlling or stabilizing assembly 40 includes a curved bi-metal or bi-metallic element such as a strip or plate 42. The element 42 may also be referred to as bi-thermal since it includes materials having two distinct thermal coefficients of expansion. The bi-metal strip or plate 42 comprises two relatively thin strips of distinct materials, preferably metals, having different thermal coefficients of expansion. Typically, steel and copper are utilized although other metals, alloys and materials are suitable. The two strips of metal are intimately bonded together by, for example, brazing or welding or an adhesive. The metal or material having the higher coefficient of thermal expansion forms or constitutes the concave side or inner component 42A of the strip or plate 42 and the metal or material having the lower coefficient of thermal expansion forms or constitutes the convex side or outer component 42B of the strip or plate 42. Thus, the inner component 42A is preferably copper and the outer component 42B is preferably steel.

The bi-metal strip or plate 42 is secured to the inside surface 44 of the center housing 18 or a suitable boss or projection on the inside surface 44 by a fastener 46 such as a rivet, threaded fastener or stake. Preferably, the fastener 46 and the secured end of the bi-metal strip or plate 42 are disposed approximately at the upper level of the lubricating fluid 36. In a quiescent, ambient temperature condition, for example, 68 degrees Fahrenheit (20 degrees Celsius), the bi-metal strip or plate will be shaped and configured to conform closely to the periphery of the ring gear 30. Depending upon the characteristics of the lubricating fluid 36 such its viscosity and the variation of viscosity with temperature, the thermal coefficients of expansion of the materials utilized to form the bi-metal strip or plate 42 and other design and performance parameters, this temperature at which the bi-metal strip 42 conforms to the periphery of the ring gear 30 may vary over a significant range, for example, from 32 degrees Fahrenheit (0 degrees Celsius) or lower to 100 degrees Fahrenheit (38 degrees Celsius) or higher.

From its point of attachment by the fastener 46, the bi-metal strip 42 curves around the ring gear 30 in the direction of its rotation when the vehicle is moving forward. Therefore, as illustrated in FIG. 2, the axles 16 and the ring gear 30 rotate clockwise as viewed from the left side when the vehicle is moving forward as indicated by the arrows. Thus the bi-metal strip or plate 42 curves around the ring gear 30 from the side opposite the worm or drive gear 24 toward the front of the center housing 18.

The bi-metal strip or plate 42 includes a stop or bumper 48 that engages a flange or projection 52 extending from the inner surface 44 of the center housing 18. Contact between the stop or bumper 48 and the projection 52 limits inward translation or the bi-metal strip or plate 42, i.e., travel toward the ring gear 30, to prevent contact between the strip or plate 42 and the ring gear 30. The stop or bumper 48 affects and contributes to the operation of the bi-metal strip 42 since it establishes a minimum, low temperature position below which no additional motion toward the ring gear 30 will occur. Viewed from the opposite operational perspective, contact between the stop or bumper 48 and the projection 52 may be adjusted to ensure that no motion of the bi-metal strip or plate 42 away from the ring gear 30 occurs until the temperature of the lubricating fluid 36 has increased to a particular temperature. The bi-metal strip or plate 42 has a width at least as wide as, and preferably wider than, the nominal width of the ring gear 30. If desired, the bi-metal strip or plate 42 may include thin, inwardly directed sidewalls (not illustrated) which extend toward the ring gear 30 and define a shallow channel or groove which receives the ring gear 30. Such a channel or groove enhances the ability of the ring gear 30 to collect and carry lubricating fluid 36 as it rotates.

In operation, the lubricant temperature stabilizing or controlling assembly 40, if beginning from a cold or ambient temperature start, will be in the position illustrated in FIG. 2, that is, closely conforming to the periphery of the ring gear 30. In this position and temperature state, the stop or bumper 48 may be engaging the flange or projection 52 to prevent the bi-metal strip or plate 42 from translating into contact with the ring gear 30 due to the low temperature. So disposed, as the ring gear 30 begins to rotate as the vehicle moves, lubricating fluid 36 that is carried by and between the gear teeth of the ring gear 30 will be directed back to the sump in the center housing 18 and, to the extent possible, be warmed by the mechanical motion, friction and meshing of the worm gear 26 and the ring gear 30.

Figure 3:
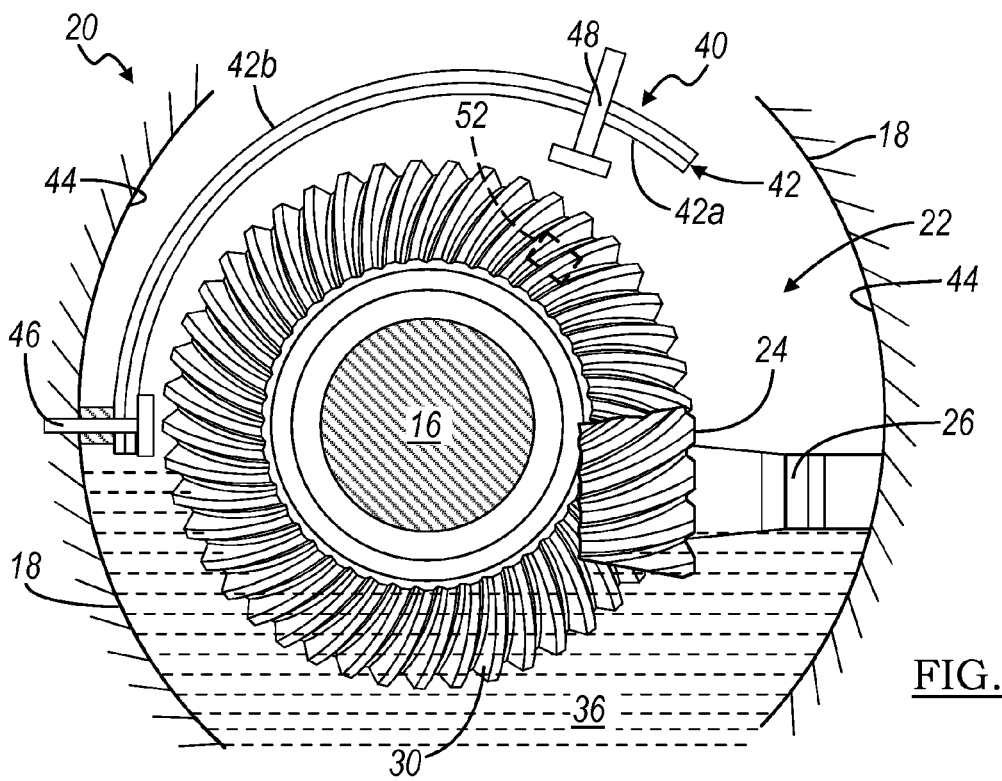
FIG. 3 is a side elevational view of a hypoid gear set of a rear axle or differential incorporating the temperature controller of the present invention at a high temperature.

Referring now to FIG. 3, after the differential assembly 20 has operated for a period of time, and the temperature of the lubricating fluid 36 has risen, the bi-metal strip or plate 42 will begin to straighten and move away from the ring gear 30. As it does so, as the speed of the ring gear 30 increases and as the viscosity of the lubricating fluid 36 reduces, an increasing flow of the lubricating fluid 36 is directed toward the inner surface 44 of the center housing 18. This redirected flow of lubricating fluid 36 transfers heat from the lubricating fluid 36 to the center housing 18 and thence to the ambient.

From the foregoing, it will be appreciated that if the temperature of the lubricating fluid 36 begins to fall due, for example, to changed weather or vehicle activity, the bi-metal strip or plate 42 will begin to curve back toward the ring gear 30 thus lessening the flow of lubricating fluid 36 directed to the inner surface 44 of the center housing 18 and reducing the heat transfer to the center housing 18 and the ambient. In this manner, the temperature of the lubricating fluid 36 is stabilized, i.e., rendered more constant, by linking the rate of heat dissipation to the temperature of the lubricating fluid 36.

When the vehicle has been inactive for a period of time and the lubricating fluid 36 in the center housing 18 has cooled, the bi-metal strip or plate 42 returns to the position illustrated in FIG. 2.

Figure 4:
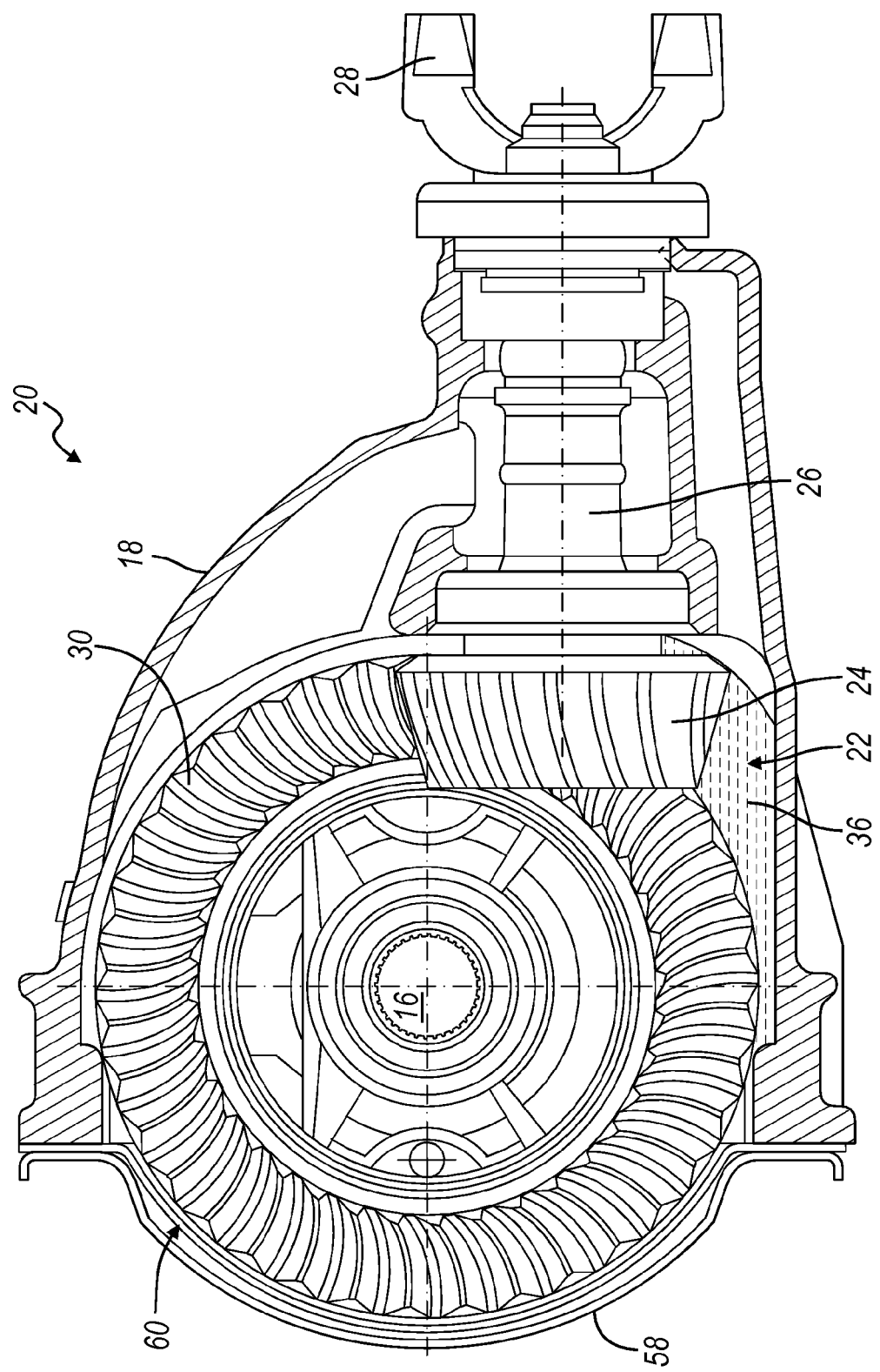
FIG. 4 is a full sectional view of a rear axle of differential of a motor vehicle illustrating another embodiment of the present invention.

Referring now to FIG. 4, another embodiment of the lubricating fluid temperature controlling or stabilizing assembly according to the present invention is illustrated and designated by the reference number 60. It will be appreciated that the assembly 60 is also utilized with a housing 18 of a differential assembly such as a rear differential assembly 20 having a hypoid gear set 22 including a worm or drive gear 24 mounted on a stub shaft 26 which terminates in a flange or universal joint 28. A ring gear 30 is in constant mesh with the worm gear 24 and drives, through a conventional caged bevel gear set (not illustrated), a pair of axles or half shafts 16 (one of which is illustrated).

The housing 18 includes a rear cover or plate 58 which is secured thereto by a plurality of threaded fasteners such as bolts (not illustrated). The lubricating fluid temperature controlling or stabilizing assembly 60 includes a curved strip or baffle 62 which is disposed between the ring gear 30 and the rear cover 58 of the differential assembly 20 and which preferably conforms to the curvature of the ring gear 30. The baffle 62 is fabricated of a bi-thermal material, preferably two metals having distinct thermal coefficients of expansion and typically, copper and steel.

Figure 5:
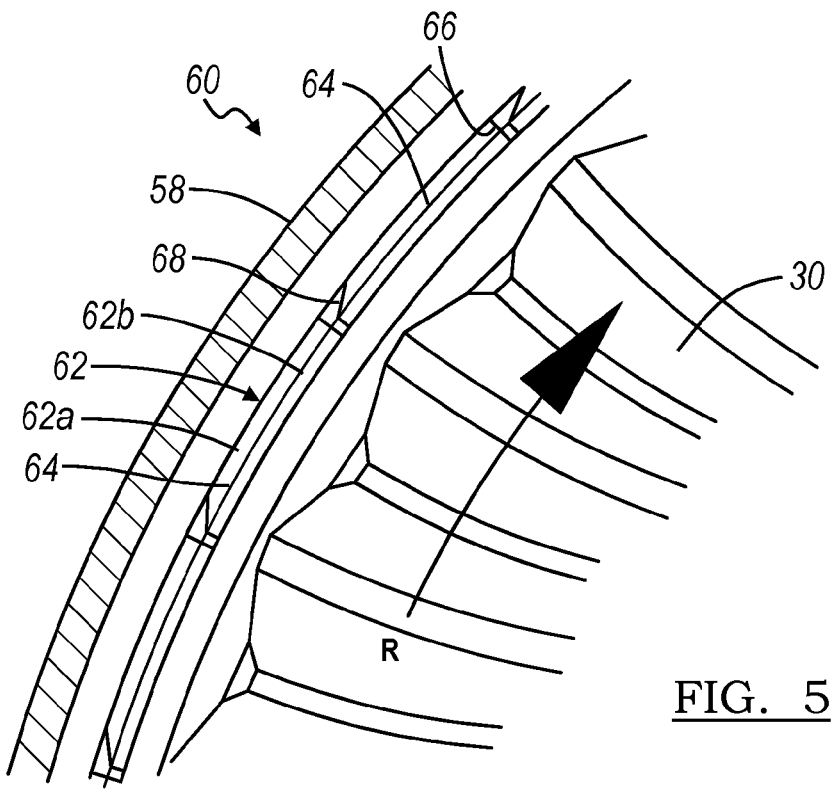
FIG. 5 is an enlarged, fragmentary sectional view of another embodiment of the present invention at a low temperature.

Referring now to FIG. 5, the curved strip or baffle 62 includes a first or outer layer 62A of a material, typically a metal, having a higher thermal coefficient of expansion and a second or inner layer 62B of a material, typically a metal, having a lower thermal coefficient of expansion. The two layers 62A and 62B are intimately bonded by welding, brazing or other securement method. The outer layer 62A is preferably copper and the inner layer 62B is preferably steel although many other metals and alloys having the necessary thermal characteristics may be utilized.

The curved strip or baffle 62 defines a plurality of louvers or flaps 64. The louvers or flaps are small panels defined by three sided or U-shaped cutouts which free a bottom and two side of the louvers or flaps 64 which are secured to the baffle 62 along one edge 66. Opposite the edge 66, the louvers or flaps 64 may include a beveled or chamfered edge 68 which streamlines fluid flow thereover. In FIG. 5, the louvers or flaps 64 are shown in a cold or low temperature condition. As such, the louvers or flaps 64 conform generally to the overall curve of the strip or baffle 62 and prevent flow of the lubricating fluid 36 through the baffle 62. The "R" and arrow indicate the direction of rotation of the ring gear 30 both here and in FIG. 6.

Figure 6:
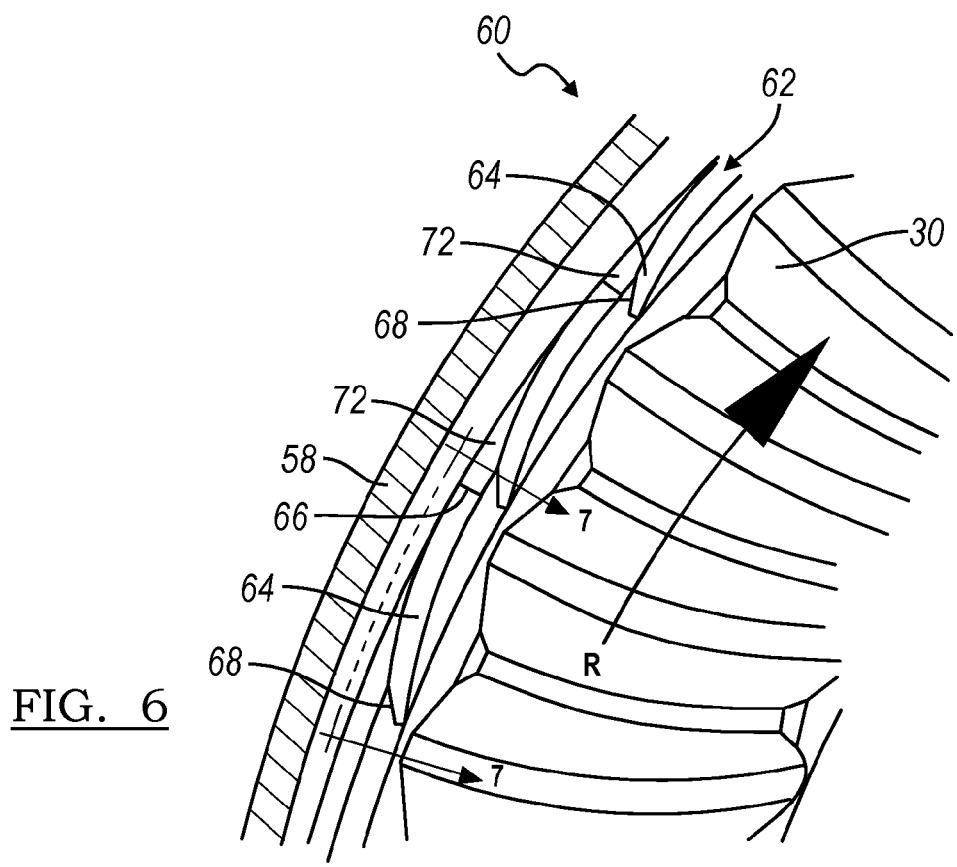
FIG. 6 is an enlarged, fragmentary sectional view of another embodiment of the present invention at a high temperature.

In FIG. 6, the louvers or flaps 64 are shown in a hot or operating temperature condition. Here, the louvers or flaps 64 have curved inwardly and opened a plurality of apertures or windows 72 through which the lubricating fluid 36 may flow so that it will contact the rear cover 58 of the housing 18 and transfer heat to the ambient. It will be appreciated that the particular temperature to louver or flap movement relationship may be established by experimental and empirical study to best match the goals of performance, lubrication and energy efficiency.

Figure 7:
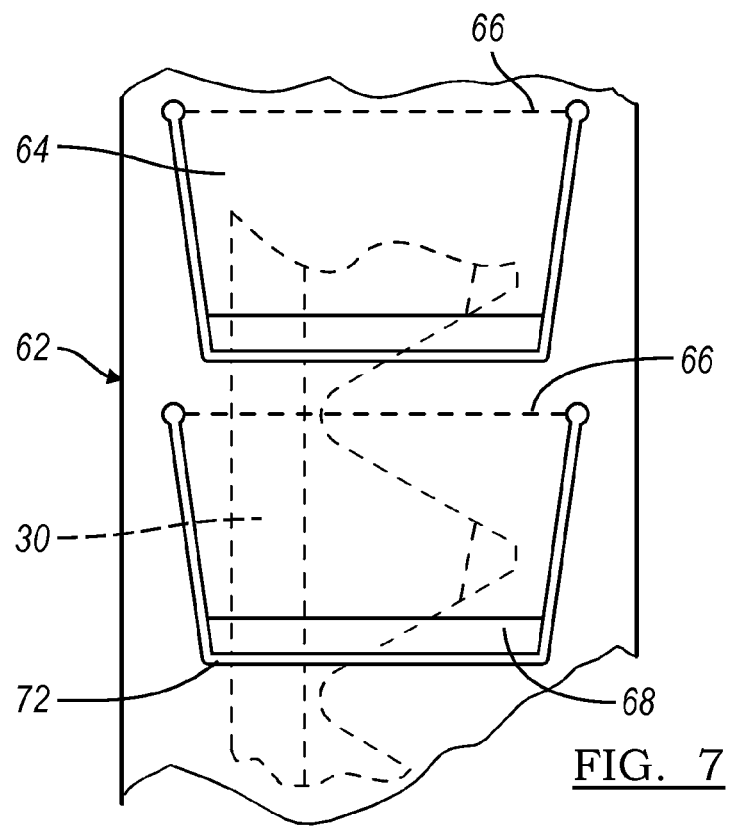
FIG. 7 is an enlarged, fragmentary sectional view of the louvers or flaps of another embodiment of the present invention taken along line 7-7 of FIG. 6.

FIG. 7 generally illustrates the alignment of the strip or baffle 62 with the ring gear 30 as well as their relative widths. It will be noted that the strip or baffle 62 is generally centered upon and is significantly wider than the ring 30 gear and that the louvers or flaps 64 are somewhat wider than the ring gear 30.

The description of the invention is merely exemplary in nature and variations that do not depart from the gist of the invention are intended to be within the scope of the invention. Such variations are not to be regarded as a departure from the spirit and scope of the invention.

What is claimed is:

1. A passive fluid temperature controller comprising, in combination,
a housing,
a sump in said housing for receiving fluid,
a gear supported for rotation in said housing and in contact with said fluid in said sump,
a bi-thermal element encircling greater than one quarter of a diameter of said gear having a first layer of a material having a higher coefficient of thermal expansion and a second layer of a second material having a lower coefficient of thermal expansion, wherein said bi-thermal element includes at least a first position at a first temperature and a second position at a second temperature that is higher than said first temperature, and wherein said bi-thermal element is continuously positionable between said first and second positions by thermal expansion and contraction of said first and second layers of material as a temperature of said bi-thermal element moves between said first and said second temperatures, and wherein said bi-thermal element directs an increasing amount of said fluid towards said housing as said bi-thermal element moves from said first position to said second position; wherein the said bi-thermal element is attached to the interior of the sump at a single point on a proximate end of the said bi-thermal element.

2. The passive fluid temperature controller of claim 1 further including a stop for limiting movement of said element toward said gear.

3. The passive fluid temperature controller of claim 1 wherein said bi-thermal element includes a plurality of louvers, and wherein said louvers are substantially closed in said first position and are open in said second position of said bi-thermal element.

4. The passive fluid temperature controller of claim 1 wherein said fluid is a gear lubricant.

5. The passive fluid temperature controller of claim 1 wherein said first and second materials are metals.

6. The passive fluid temperature controller of claim 1 wherein said first material is copper and said second material is steel.

7. The passive fluid temperature controller of claim 1 wherein said thermal element extends around said gear from a point of securement to said housing in a direction corresponding to the more common direction of rotation of said gear.

8. A lubricant temperature stabilizing device comprising, in combination,
    a housing defining a lubricant sump,
    a gear disposed for rotation in said housing and lubricated by lubricant in said sump,
    a bi-metal element at least partially encircling said gear and having a first metal layer more proximate said gear having a first thermal coefficient of expansion and a second metal layer more distant said gear having a second thermal coefficient of expansion,
    whereby as a temperature of said lubricant rises, said element deforms to direct more lubricant to an inside wall of said housing; wherein the said bi-metal element is attached to the interior of the sump at a single point on a proximate end of the said bi-thermal element.

9. The lubricant temperature stabilizing device of claim 8 wherein said first metal is copper and said second metal is steel.

10. The lubricant temperature stabilizing device of claim 8 wherein said first metal is steel and said second metal is copper.

11. The lubricant temperature stabilizing device of claim 8 further including a stop for limiting translation of said element toward said gear.

12. The lubricant temperature stabilizing device of claim 11 wherein said stop includes a projection from said housing.

13. The lubricant temperature stabilizing device of claim 8 wherein said bi-metal element is curved.

14. A differential lubricating fluid temperature stabilizer comprising, in combination,
    a differential housing,
    a lubricating fluid sump in said housing,
    a gear disposed for rotation in said housing and said sump,
    a bi-metallic element extending about a portion of said gear, said element having a first layer of a first metal having a higher thermal coefficient of expansion and a second layer of a second metal having a lower thermal coefficient of expansion,
    whereby said bi-metallic element thermally deforms to direct an increasing amount of said lubricating fluid towards said differential housing as a temperature of said bi-metallic element increases; wherein the said bi-thermal element is attached to the interior of the sump at a single point on a proximate end of the said bi-metallic element.

15. The differential lubricating fluid temperature stabilizer of claim 14 wherein said first metal is steel and said second metal is copper.

16. The differential lubricating fluid temperature stabilizer of claim 14 wherein said first metal is copper and said second metal is steel.

17. The differential lubricating fluid temperature stabilizer of claim 14 further including a stop for limiting travel of said bi-metal element toward said gear.

18. The differential lubricating fluid temperature stabilizer of claim 14 wherein said bi-metal element extends around said gear from a point of securement to said housing in a direction corresponding to rotation of said gear associated with forward motion of a vehicle.

19. The differential lubricating fluid temperature stabilizer of claim 14 wherein said bi-metallic element includes plurality of flaps.

20. The differential lubricating fluid temperature stabilizer of claim 14 wherein said bi-metal element is curved.

* * * * *